No. 788,848. PATENTED MAY 2, 1905.
J. C. RIEGEL.
VARIABLE SPEED HYDRAULIC POWER TRANSMISSION MECHANISM.
APPLICATION FILED SEPT. 21, 1904.

WITNESSES:
O. C. Gibson.
John T. Schrott.

INVENTOR
John Clinton Riegel.
BY
Fred G. Dieterich & Co.
ATTORNEYS.

No. 788,848.                                                         Patented May 2, 1905.

UNITED STATES PATENT OFFICE.

JOHN CLINTON RIEGEL, OF POTTSVILLE, PENNSYLVANIA.

VARIABLE-SPEED HYDRAULIC-POWER-TRANSMISSION MECHANISM.

SPECIFICATION forming part of Letters Patent No. 788,848, dated May 2, 1905.

Application filed September 21, 1904. Serial No. 225,359.

*To all whom it may concern:*

Be it known that I, JOHN CLINTON RIEGEL, residing at Pottsville, in the county of Schuylkill, in the State of Pennsylvania, have invented certain new and useful Improvements in Variable-Speed Hydraulic-Power-Transmission Mechanism, of which the following is a specification.

My invention relates to certain new and useful improvements in variable-speed hydraulic-power-transmission mechanisms which are of a simple construction, and which can be easily applied to the standard type of motor-vehicles operating at the greatest efficiency, and which are thoroughly reliable in their operation and always under easy and accurate control.

My invention primarily has for its object to provide a mechanism of this character which is positive in its action and which dispenses with the various friction-clutches, chain and other gear mechanisms, &c., now in common use on motor-vehicles of the standard types.

Again, my invention seeks to provide a power-transmission mechanism whereby starting, stopping, coasting, braking, reversing, and all changes of speed can be absolutely controlled by the manipulation of a single lever and whereby the speed of the vehicle can be varied from zero to maximum while the power or main drive motor operates at a constant speed, thus allowing the vehicle to be driven up steeper grades than would be otherwise possible.

A further object of my invention is to provide means whereby the vehicle may be run backward or reversed without changing the direction of rotation of the constant-speed drive-motor and also to provide a mechanism of the character stated which will permit the vehicle to start running without the objectionable jarring and jumping which is so common in motor-vehicles now in daily use, particularly those vehicles of large horse-power.

Another object of this invention is to provide an automatic governor mechanism which is operable during the ascent of grades of hills to vary the quantity of fluid pumped according to the steepness of the grade of the hill to be ascended, so that the main power-motor may be able to overcome the resistance offered by said vehicle. This quantity decreases when the grade increases, and vice versa.

My invention also comprises certain details of construction and novel combination and arrangement of parts, all of which will be first described in detail and then specifically pointed out in the appended claims, reference being had to the accompanying drawings, in which—

Fig. 6 is a similar view, the parts being shown in the position they assume when the motor-vehicle is traveling forward at full speed. Fig. 7 is an enlarged horizontal section of the pumping mechanism on the line 7 7 of Fig. 2. Fig. 8 is a cross-section thereof on the line 8 8 of Fig. 7. Fig. $8^a$ is a similar view on the line $8^a$ $8^a$ of Fig. 5.

Referring now to the accompanying drawings, in which like numerals and letters of reference indicate like parts in all of the figures, 1 designates the casing of what I term the "pressure generater or pump" P, having the supports or beams $2^a 2^a$, by means of which the pump can be connected to the frame of the vehicle-body B. The casing 1 has two removable heads 3 and 4, whereby ready access to the interior of the casing can be had, and the said casing 1 merges with the supplemental-gear housings $1^a 1^b$, connected by the cylindrical bearing 7, for a purpose presently explained.

The casing-heads 3 and 4 are provided with bearing extensions 8 and 6, respectively, in alinement with the bearing 7, and the said extensions 8 and 6, as well as the bearing 7, have babbitted linings $8^a$, $6^a$, and $7^a$, respectively.

5 designates a shaft rotatable in the bearings 8, 7, and 6, which shaft is connected in any approved manner to the drive-shaft $m$ of the power or main drive motor M, which motor M may be of any approved construction, and provided with the usual governor devices for allowing the motor to run at a constant speed, as the construction of the said motor *per se* forms no part of my present invention.

Keyed or otherwise secured to the shaft 5 is a gear $5^b$, rotatable within the housing $1^b$, and a second gear $5^c$, rotatable within the housing $1^a$, the gear $5^c$ being provided with peripheral ribs $5^d$ for a purpose presently explained. The head 3 is also provided with an extension 9, forming a piston-chamber $9^a$, and the said extension 9 carries a second and concentrically-arranged cylindrical member 10, which forms a supplemental piston-chamber $10^a$.

11 designates a cylindrical extension on the head 4 in alinement with the cylindrical member 10 and forming a cylindrical piston-chamber $11^a$. Mounted for endwise movement in the chamber $1^x$ of the casing 1, with its ends in the piston-chambers $10^a 11^a$, is a shaft 20, which is preferably hollow, for a purpose presently understood. At each end the shaft 20 carries a piston-head 21 $21^a$, endwise movable in the chambers $10^a 11^a$ and prevented from rotary movement by the feather-and-groove connections $21^b$. The piston-heads 21 $21^a$ are secured to move endwise with the shaft 20 by the bolt $20^a$, as clearly shown in the drawings.

$20^b 20^b$ designate apertures in the shaft 20. The end of the shaft 20 rotates in pistons 21 $21^a$, which serve as bearings for the shaft.

Mounted on the shaft 20 to turn therewith, but so arranged as to allow endwise movement of the shaft, is a gear 22, which meshes at all times with the gear $5^b$ and serves to operatively connect the shafts 5 and 20.

Rigidly secured to the shaft 20 is a second gear 23, having grooves $23^a$ for receiving the ribs $5^d$ of the gear $5^c$, and the said gears 23 and $5^c$ are what I shall hereinafter term the "rotary pumping-pistons." The rotary piston 23 is held to move endwise with the shaft 20 by the piston-heads 24 25, which are held in position on the shaft 20 by the collars $24^a 25^a$. The head 24 is prevented from rotation in any approved manner, preferably by providing it with a groove $24^b$ to coöperate with the rib $9^b$ on the interior wall of the chamber $9^a$.

12 and 13 indicate closure-caps for the chambers $11^a 10^a$, respectively.

$1^m 1^n$ designate inlet and outlet ports for the pump-casing 1, with which ports the pipes 15 and 14, leading from the controlling-valve V, connect.

16 designates a short pipe-section communicating with the pipe 14 and the chamber $10^a$ in front of the piston 21 for a purpose presently to appear. The chamber $11^a$ communicates with the valve V through a pipe 17, as shown, and will be more clearly explained hereinafter.

The gears $5^b$ and 22 serve to synchronize or steady the motion of the rotary interconnected pumping-pistons $5^c$ and 23, as well as to keep them in proper alinement at all times, so that they may be instantly meshed, when desired, it being understood that normally when the vehicle is at rest or coasting the said rotary pistons $5^a$ and 23 are out of mesh with one another. The gears $5^c$ and 23 closely fit the inside of the casing and serve as a pump, the quantity of fluid pumped being varied by moving the rotary piston 23 into and out of mesh with the piston $5^c$ to a greater or less degree.

The chambers $9^a 1^x$ are in communication with each other to allow a free passage for the fluid when displaced by either of the pistons 24 25.

The differential or secondary motor S (shown in detail in Figs. 15 and 16) may be either directly mounted upon the drive-axle D of the vehicle or it may be connected with the drive-axle by any suitable gearing mechanism. The secondary motor S comprises a casing 40, consisting of two parts 41 42, which are held together by the bolts 46, as shown. Each side of said casing contains a secondary shell 65, which is cast eccentrically with the outer shell to form the chambers 39 $39^a$ within the casing, and rotatable within the shell 65 are a pair of rim-gears 66 $66^a$, having gear-teeth $66^b$ on their inner peripheries, and the said gears mesh with the gears 67 $67^a$, secured to the axle-sections $d$ $d'$, respectively.

Figures 15, 16, 17, 18, 19, 20, 21, 22:
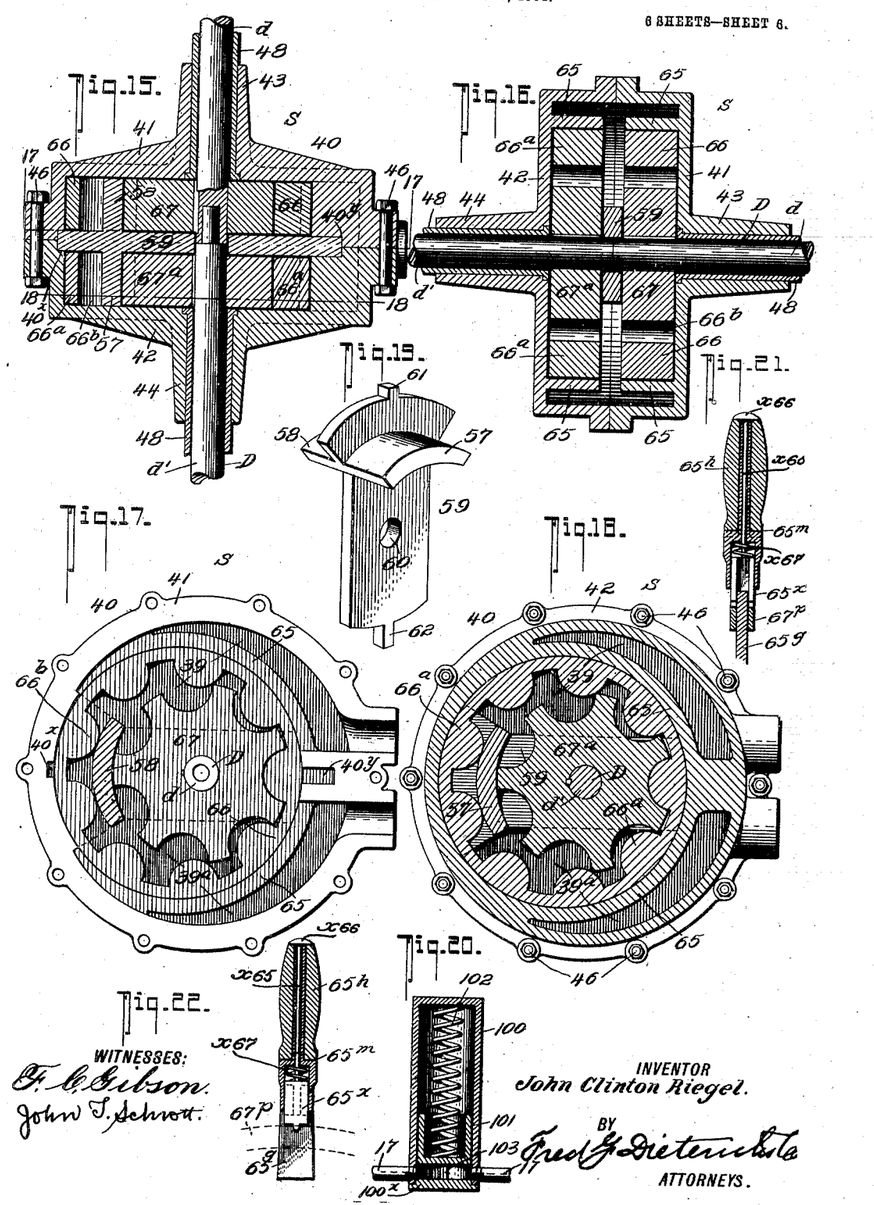
Fig. 15 is a horizontal section on the line 15 15 of Fig. 2.
Fig. 16 is a vertical cross-section on the line 16 16 of Fig. 2.
Fig. 17 is a transverse section on the line 17 17 of Fig. 15.
Fig. 18 is a similar view on the line 18 18 of Fig. 15.
Fig. 19 is a detail perspective view of the division member.
Fig. 20 is an enlarged sectional view of the hill-climbing governor mechanism.
Figs. 21 and 22 are detail sectional views of the valve-lever and its locking mechanism.

59 designates a partition placed between the two sets of gears, and the said partition has two laterally-extending wings 57 58 held between the rim-gears and the axle-gears, which wings serve to prevent passage of the fluid from one chamber 39 to the other, $39^a$, or vice versa, without rotating the gears. The casing 40 is also provided with sockets $40^x 40^y$ to receive the lug 61 62 of the partition 59, which partition 59 is also apertured, as at 60, to allow for the passage of the axle D.

Each casing-section 41 42 is provided with a bearing 43 44, respectively, which bearings 43 44 receive the ends of the bearing-sleeves 48 48 of the vehicle-axle, as shown.

37 38 designate conduit-pipes which connect chambers 39 39$^a$ with the controlling-valve V.

Figures 9, 11:
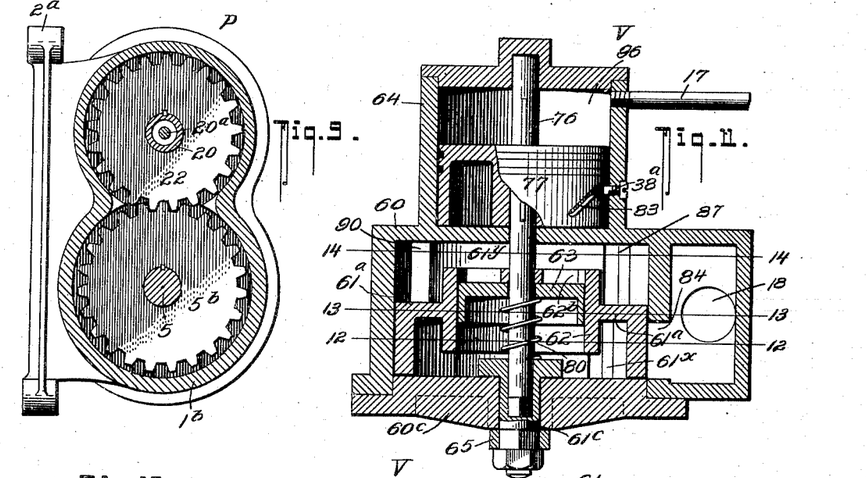
Fig. 9 is a similar view on the line 9 9 of Fig. 7.
Fig. 11 is an enlarged horizontal section of the controlling-valve mechanism on the line 11 11 of Fig. 2.
Figures 12, 13, 14:
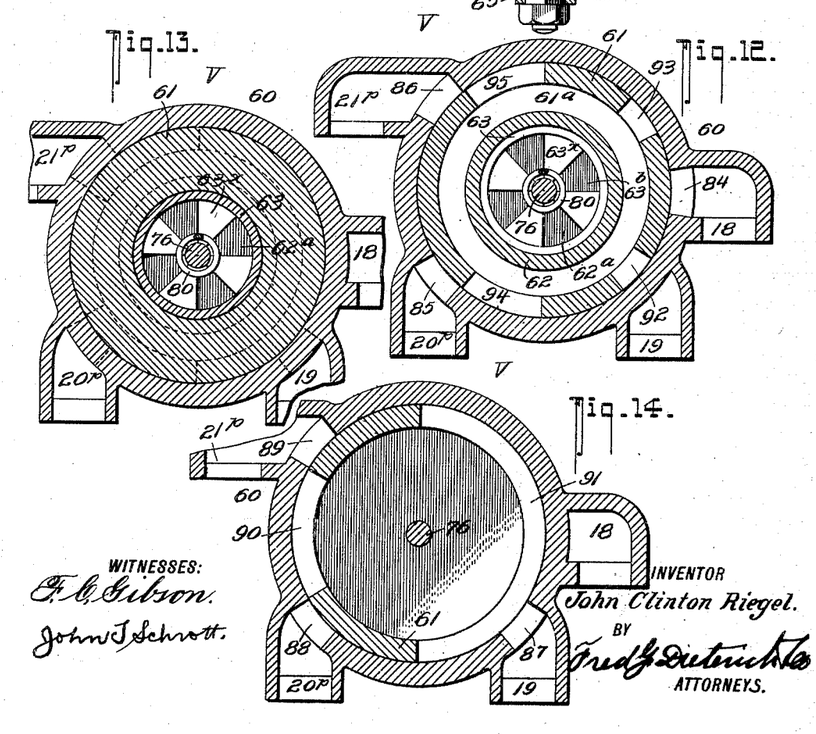
Figs. 12, 13, and 14 are cross-sections on the lines 12 12, 13 13, and 14 14 of Fig. 11, the parts being shown in the normal or braking position of the mechanism.

Referring now more particularly to Figs. 11 to 14, it will be seen the controlling-valve V comprises the casing 60, in which the valve proper, 61, is held. The valve proper, 61, is in the nature of a cylinder divided midway its ends by a partition 61$^a$, in the center of which a cylinder 62, in which the relief-valve 63 operates, is formed. The partition or web 61$^a$ divides the valve-casing into two chambers 61$^x$ 61$^y$, as shown in Fig. 11. One end of the cylinder 62 has an end wall 62$^a$, having valve-ports 62$^b$, which are normally closed by the wings 63$^x$ of the relief-valves 63. The relief-valve 63 also has valve-ports 63$^b$ for a purpose presently explained. The relief-valve 63 is normally closed by the spring 80 on the stem 76, which stem 76 passes through the relief-valve and into the hub portion 61$^c$ of the valve 61, with which hub portion it has a socketed connection. The valve-casing has a set of ports 84 85 86 communicating with the chamber 61$^x$, and a second set of ports 87 88 89 communicate with the other chamber, 61$^y$. The port 84 communicates with the chamber 18, into which the pipe 14 discharges, while the ports 85 and 88 communicate with the chamber 20$^p$, in which the pipe 38 discharges. The ports 86 and 89 open into a chamber 21$^p$, with which the pipe 37 is connected. The valve proper, 61, is provided with ports 92, 93, 94, and 95, which coöperate with the ports 84 85 86, and the said valve 61 is also provided with ports 90 91, which coöperate with the ports 87 88 89 in a manner presently more fully explained. The port 87 communicates with the chamber 19. The casing 60 is also provided with a small cylindrical extension 64 for the piston 77 to play in, and this piston is so arranged as to turn with the stem 76 and at the same time being susceptible of endwise movement thereon, such endwise movement being imparted to the piston when the stem is turned through the medium of a cam-groove 83 in the piston and the lug 38$^a$ on the casing. (See Fig. 11.) The casing 60 is closed by a cap 60$^c$, apertured to receive the hub 61$^c$ of the valve 61, to which hub the end 65 of the controlling-lever 65$^g$ is secured. A sector 67$^p$, provided with rack portions 67$^x$, 67$^y$, and 67$^z$, is provided to coöperate with the pawl 65$^x$ of the lever 65$^g$ to hold the lever to its adjusted positions.

65$^m$ designates a cam member on the lever 65$^g$, with which the cam portion 65$^n$ of the handle 65$^h$ coöperates, whereby when the handle 65$^h$ is rotated the pawl 65$^x$ will be disengaged from the rack portion of the sector 67$^p$ by the raising of the pawl 65$^x$ as the hand portion 65$^h$ is raised by the cams 65$^m$ and 65$^n$. The lever 65$^g$ is provided at its upper end with a box to receive the pawl 65$^x$, the box being open at the bottom except where closed by the top edge of the main portion of the lever 65$^g$, so as to allow the pawl 65$^x$ to protrude. The upper end of the main portion of the lever 65$^g$ is provided with a slot to receive the transverse web of the pawl, the sides of the pawl 65$^x$ straddling the main portion of the lever. The lower end of the box is joined to the edge of the lever either by welding or otherwise to form an integral structure therewith. The pawl 65$^x$ is provided with a rod $x^{65}$, that projects through the handle 65$^h$ and is upset at $x^{66}$ in order to be engaged by the handle and raised when the latter is turned, a coil-spring $x^{67}$ being provided around the rod $x^{65}$ within the pawl-box to normally press the pawl into engagement with the sector.

100 designates what I term a "hill-climbing governor mechanism," which comprises a casing in which a piston 101 operates, and the said piston 101 is normally held near one end of the casing by a spring 102, the movement of the piston due to the spring being limited by the lug 103. This governor is connected in series with the pipe 17, the pipe 17 discharging into the casing between the closure-cap 100$^x$ and the piston, as clearly shown in Fig. 20.

Figure 1:
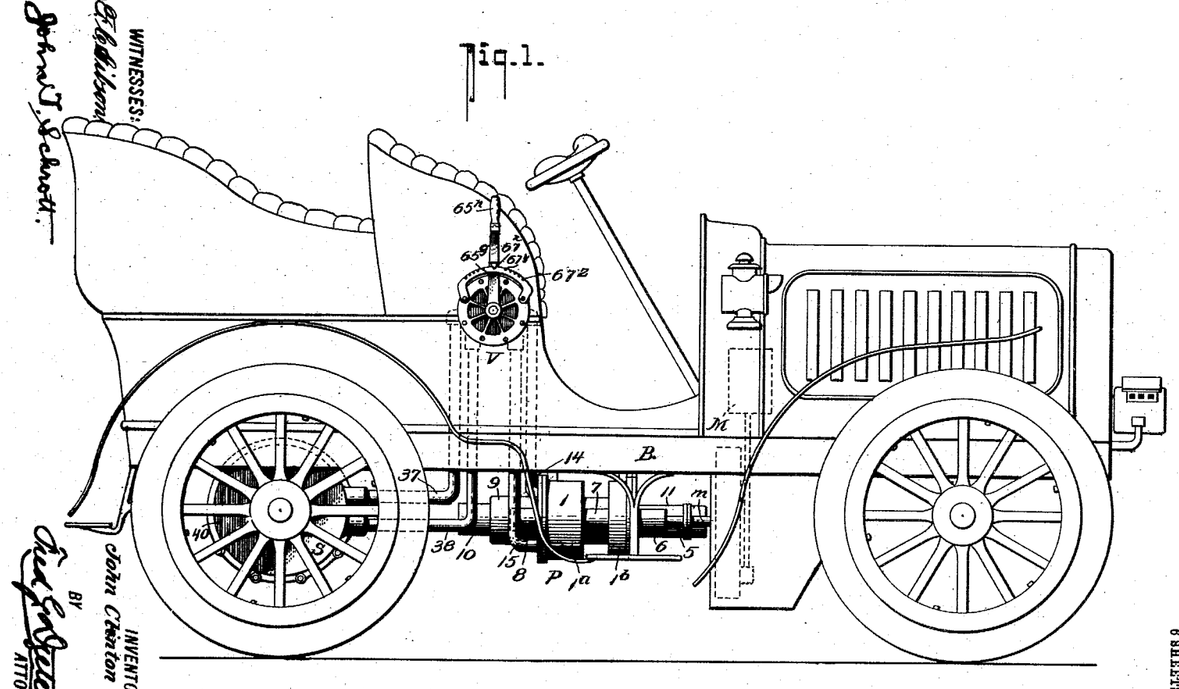
Figure 1 is a side elevation of a motor-vehicle with my invention applied.
Figures 2, 3:
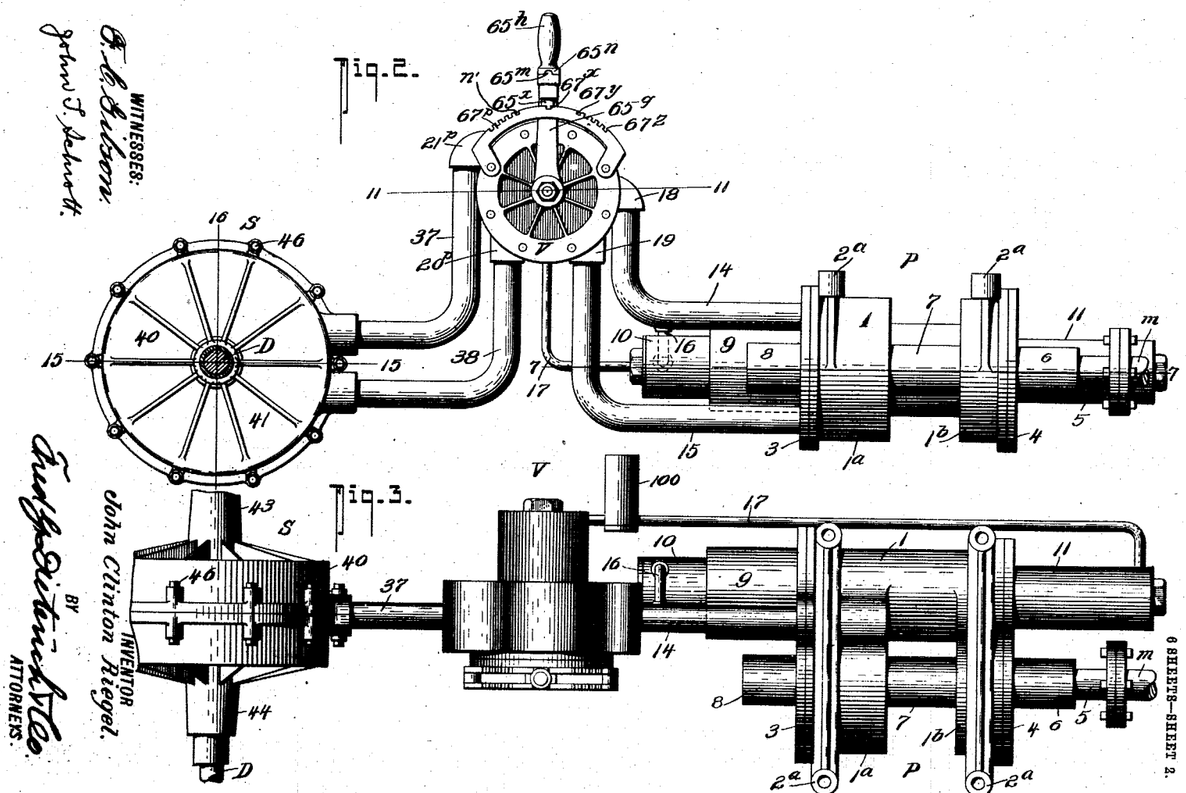
Fig. 2 is an enlarged detail side elevation of my invention.
Fig. 3 is a top plan view thereof.
Figures 4, 5, 10:
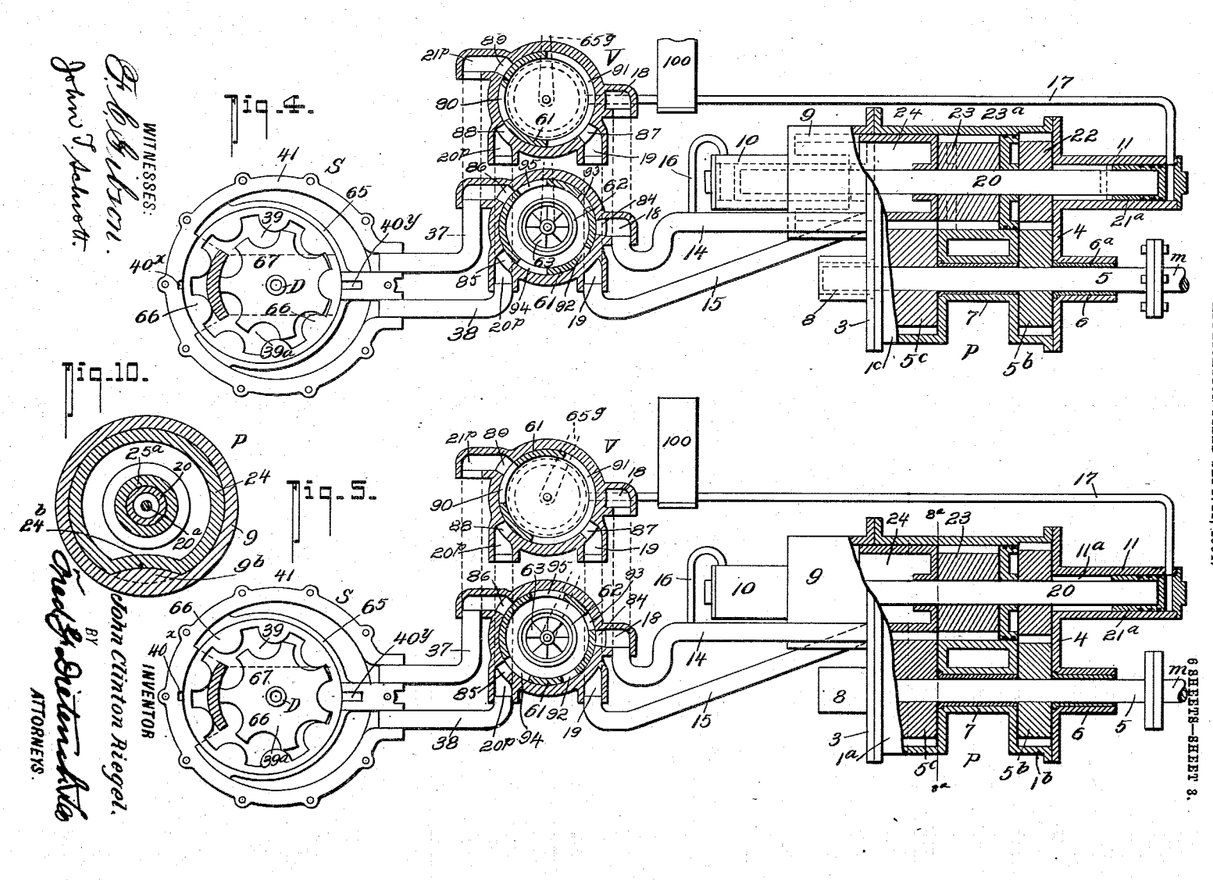
Fig. 4 is a diagrammatic section showing the position of the parts when the vehicle is at rest.
Fig. 5 is a similar view showing the position of the parts when the controlling-lever is turned to place the parts in the coasting position.
Fig. 10 is a similar view on the line 10 10 of Fig. 7.
Figures 5, 7, 8, 8A:
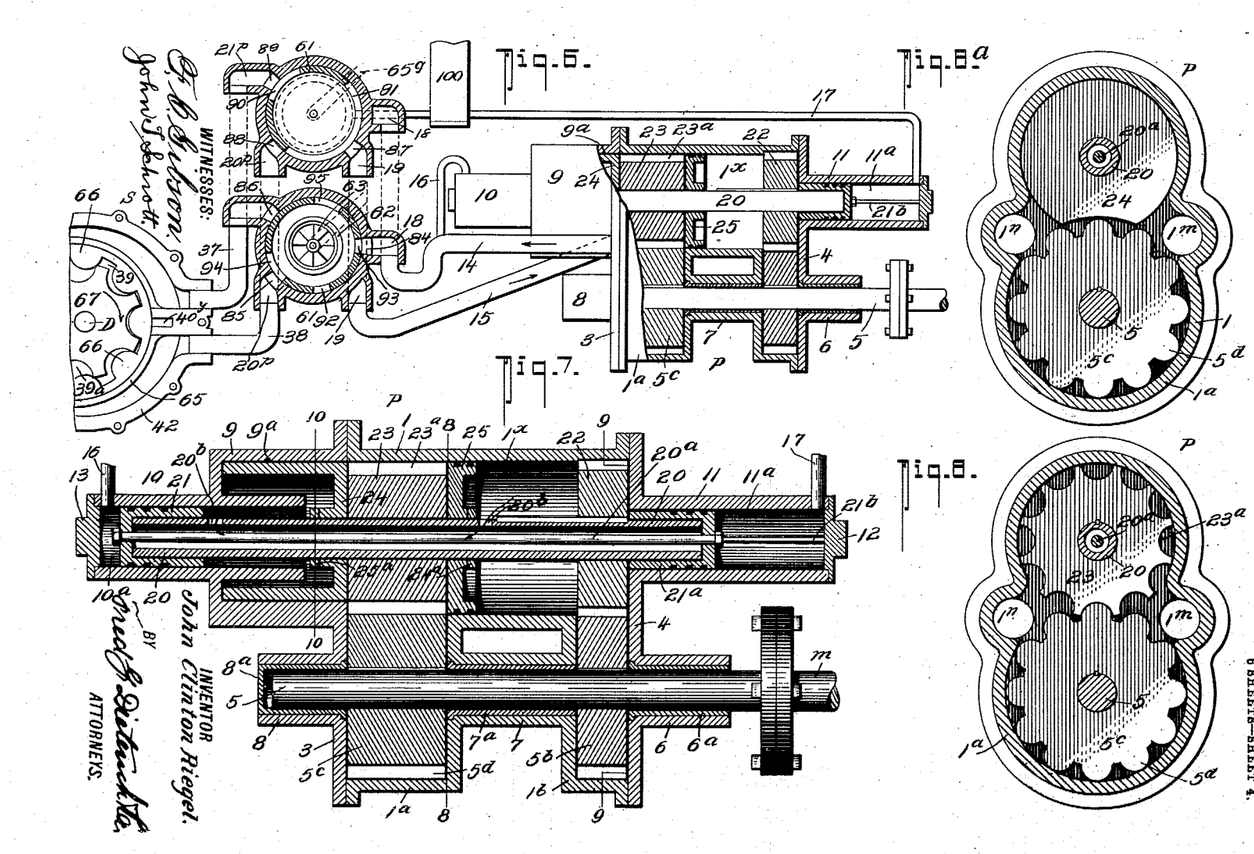

Operation: Assuming the ports to be in the position shown in Fig. 4, the pump, the secondary motor, the valve mechanism, and the various conduit-pipes having been filled with a suitable fluid, (preferably lubricating-oil,) the drive-motor M is started under suitable governor-control (not shown) to operate the shafts 5 and 20, gears 5$^b$ 22, and pistons 5$^c$ and 23 at a constant speed. The rotary pumping-gear 23 being out of mesh with rotary gear 5$^c$, as shown in Fig. 4, no fluid will be pumped, said pistons cannot be in mesh when the controlling-lever occupies its mid-position and not when in coasting position. Supposing the vehicle had been driven by said power-motor and cut off by closing port 84, said pistons would be thrown out of mesh, as the port 84, connected to the discharge-chamber through the pipe 14, being closed the fluid in pipe 14 will be compressed, due to the pumping action. This compression of the fluid in pipe 14 forces a portion of the fluid through pipe 16 into chamber 10$^a$ and moves the piston 21, together with the shaft and the rotary pumping-gear 23, out of engagement with the rotary gear 5$^c$, the parts then being in the position shown in Fig. 4. As soon as the rotary gears 23 5$^c$ are out of mesh with each other the pump P ceases to operate as such, it being understood, however, that the shaft 5 and the pumping-gear 5$^c$ continue to revolve at a constant speed. When the valve V is in the position shown in Fig. 4, all the ports of the valve leading to the secondary motor are closed, and as there is no communicating passage between the chambers 20$^p$ and 21ᵖ the vehicle will be in a locked position, as the secondary motor cannot rotate, this position serving as a braking position. Now, assuming the valve-lever to be thrown forward to engage the first notch, the parts will be in the position shown in Fig. 5, the ports 94 85 being in communication with each other and the ports 89 90 being in communication with each other. When the valve V is in the position shown in Fig. 5, communication between pipes 37 38 is had through the medium of ports 89 90 and the relief-valve 63 and ports 85 and 94 to allow a circulation of the fluid from chamber 39 to 39ᵃ through the medium of the valve-chambers 61ʸ 61ˣ. This position of the parts permits the vehicle to coast or move by its own momentum. Now, assuming the valve-lever to be moved farther forward to any notch thereafter, port 93 will open to port 84 and the piston 77 will receive an endwise movement through the groove-and-lug connection, (shown in detail in Fig. 11,) thus displacing the fluid of chamber 96 and transferring it through the conduit or pipe 17 to the chamber 11ᵃ, against the piston 21ᵃ, and move the shaft 20, together with the rotary pumping-gear 23, into mesh with the other rotary pumping-gear, 5ᶜ. The position of the gears 23 5ᶜ with respect to one another depends upon the position of the valve-lever. The said rotary pistons 23 5ᶜ are entirely in engagement with each other, as shown in Fig. 6, when the valve-lever is thrown entirely over to the last notch. The pump or generator P will start to draw fluid from chamber 61ʸ through the pipe or conduit 15 into the pumping-chamber as soon as the least portion of the intergeared pistons 23 and 5ᶜ are in mesh and gradually increase the quantity to its full capacity as the meshed portions increase to full mesh, as shown in full lines in Fig. 6. The fluid as it enters the pumping-chamber will be carried farther by the teeth of the intergeared rotary pumping-pistons and forced out through pipe 14 to the chamber 61ˣ and then through the pipe 38 to the secondary motor, which will be rotated by fluid-pressure in the direction indicated by the arrow in Fig. 6, the fluid returning through pipe 37 to chamber 61ʸ, the circulation being maintained so long as the parts are in the position shown in Fig. 6, it being understood that when the parts are in the position shown in Fig. 6 the ports 87 91 will be in communication with each other, as will be also ports 89 90. Ports 85 94 and ports 93 84 will also be in communication with each other. When the vehicle is climbing a grade, the resistance will be greater and the increasing pressure in pipe 14 will tend to force fluid through pipe 16 into chamber 10ᵃ against piston 21 to throw the pumping-gears 23 and 5ᶜ out of mesh with each other. As the piston 77 has been moved forward, (see Fig. 6,) then as the shaft 20 is moved to the right the fluid in chamber 11ᵃ will be compressed and forced into the hill-climbing governor 100, tending to force the piston 101 against the spring-pressure. This variation of the pistons 101 and 23 will depend upon the steepness of the grade, and as the vehicle again comes to a normal position the spring will force the piston 101 back to its normal position, which in turn causes the fluid in said governor to be forced back into chamber 11ᵃ to again bring the intergeared rotary pumping-pistons into full mesh with each other. The operation of the hill-climbing governor is entirely automatic. When the valve-lever is thrown backward from mid-position to engage the notch n', the brake is released, port 84 is closed, port 95 registers with port 86, and port 90 registers with port 88, the vehicle being then allowed to coast in opposite or rearward direction, the fluid passing through valve 63 from chamber 61ʸ to chamber 61ˣ, as before explained. When the valve-lever is thrown, any further backward power is applied and the vehicle is reversed or run in the opposite direction. The cam-groove 83 is duplicated beyond the screw 38ᵃ, so that backward movement of the piston 77 will also cause the necessary endwise movement thereof.

The action of the pump is precisely the same in operation when the vehicle is running backward as when it is running forward except that the forward course is changed from chamber 61ˣ and transmitted through conduit 37 to the secondary motor, returning through conduit 38 to the chamber 61ʸ, and thence through the pump in the same manner as when the vehicle is going forward.

It should be understood that when the valve-controlling lever is in the midway position and engaging notch 67ˣ the running-gear is locked, as the secondary motor cannot rotate. Moving lever to notch 97ʸ gradually releases the brake to allow the vehicle to coast. Moving the lever any farther forward will apply power and vary the speed of the vehicle to the extent the lever is moved. When the lever occupies the extreme forward position, the vehicle will travel at the fastest rate that the motor is able to propel the same.

To travel at full speed and in mounting steep grades, the lever occupies the extreme forward position.

Moving lever backward from forward position will decrease speed accordingly and disconnect the power, allowing the mechanism to coast or allowing a braking action, as desired.

By moving the lever backwardly from mid-position the above operations are duplicated, with the exception that the vehicle is run in the opposite direction.

While I have stated that I prefer to use lubricating-oil as the fluid in my mechanism, yet I desire it understood that any suitable fluid may be used or the mechanism may be air-filled and operated by the circulation of the air in the various parts due to the pumping action.

From the foregoing description, taken in connection with the accompanying drawings, it is thought the complete operation, construction, and many advantages of my invention will be readily understood by those skilled in the art to which it appertains, and I desire it understood that slight changes in the detailed construction and arrangement of parts may be made without departing from the scope of the invention and the appended claims.

Having thus described my invention, what I claim, and desire to secure by Letters Patent, is—

1. A power-transmission mechanism comprising a fluid-circuit, a fluid-operated secondary motor in said circuit, means for causing a circulation of fluid in said circuit to operate said motor, a valve in said fluid-circuit, a single lever for operating said valve directly connected to the valve-stem, said valve having provisions in virtue of which, starting, stopping, coasting, braking, reversing and all changes or variations of speed of the vehicle are absolutely controlled by the manipulation of said single valve-actuating lever, means in said fluid-circuit and actuated by back pressure of the fluid due to the grade of the road for automatically controlling said means for circulating the fluid substantially as shown and described.

2. In a variable-speed hydraulic-power-transmission mechanism, the combination with the vehicle, of a vehicle-motor for propelling the same, a fluid-pressure mechanism, and a secondary motor interposed between and coupling the vehicle-motor and the running-gear of the vehicle, means interposed between the fluid-pressure mechanism and the secondary motor for controlling the circulation of fluid in the secondary motor and in the fluid-pressure mechanism, said last-named means comprising a valve, a single valve-actuating lever for said valve directly connected to the valve-stem, said valve having provisions in virtue of which starting, stopping, coasting, braking, reversing and all change or variations in speed of the vehicle are absolutely controlled by the manipulation of said single valve-actuating lever, and means interposed between the fluid-pressure mechanism and the valve, actuated by back pressure due to the grade of the road for varying the output of the fluid-pressure mechanism to automatically control the speed of the vehicle at times substantially as shown and described.

3. In a hydraulic-power-transmission mechanism, the combination with a vehicle, a vehicle-motor for propelling the same, a secondary motor connected with the running-gear of the vehicle, of a fluid-pressure mechanism interposed between the vehicle-motor and the secondary motor to couple the vehicle-motor with said secondary motor, means for varying the operation of said fluid-pressure mechanism to vary the speed of the secondary motor with relation to the speed of the vehicle-motor, and a supplemental governor means interposed between said varying means and the fluid-pressure mechanism, said supplemental governor means actuated by back pressure due to the grade of the road to vary the output of the fluid-pressure mechanism to vary the speed of the vehicle automatically when said fluid-pressure mechanism is in its secondary-motor-operating position substantially as shown and described.

4. In a power-transmission mechanism, the combination with a vehicle and a vehicle-motor mounted thereon, said vehicle including a running-gear, of a secondary motor connected with said running-gear, a fluid-pressure mechanism interposed between the secondary motor and the vehicle-motor, fluid-conveying means connecting said secondary motor with said fluid-pressure mechanism, controlling means connected in said fluid-pressure and secondary-motor-connecting means, a single lever for actuating said last-named means, said controlling means having provisions in virtue of which starting, stopping, coasting, braking, reversing and all changes or variations of speed of the vehicle are absolutely controlled by the manipulation of the single actuating-lever, and means actuated by back pressure due to the grade of the road for varying the output of the fluid-pressure mechanism to vary the speed of the vehicle automatically when said single actuating-lever is adjusted to occupy certain predetermined positions, substantially as shown and described.

5. A power-transmission mechanism comprising the combination with a vehicle and a drive-motor therefor, of a fluid-pressure generator including a pair of intergeared rotary pistons, an endwise-movable shaft for one of said pistons, supplemental piston-heads for the ends of said shaft, a secondary motor connected with the drive-axle of the running-gear of the vehicle, a fluid-conducting means connecting said secondary motor and said fluid-pressure generator, a controlling-valve connected in said last-named means, said fluid-pressure mechanism including fluid-receiving chambers for said shaft-pistons, one of said fluid-receiving chambers being in communication with the pumping-chamber containing the intergeared rotary pistons, the other supplemental piston-chamber being in communication with said valve, said valve having provisions in virtue of which fluid is forced into said other chamber to change the correlation of said intergeared pistons to vary the quantity of fluid pumped, substantially as shown and described.

6. An apparatus of the character stated, comprising in combination with the vehicle, and a constant-speed propelling-motor, a secondary fluid-operated motor connected with the drive-axle of the vehicle, a fluid-pressure generator comprising a casing, two rotatable pumping elements rotatable in said casing, one of said elements being mechanically connected with the propelling-motor whereby to receive a rotating motion, the second element adapted to be rotated by said first element and having axial longitudinal movement with respect to the first element to vary the quantity of fluid pumped, means for transferring the fluid energy from the pressure-generator to the secondary motor, means connected in said transferring means and actuated by the back pressure of the fluid due to the grade of the road, for automatically causing said axial movement, hand-operated means for controlling the secondary motor whereby the vehicle may be started, stopped and reversed, substantially as shown and for the purposes described.

7. In a power-transmission mechanism, the combination with the vehicle, of a constant-speed motor carried thereby, a variable-quantity fluid-pressure generator connected to said motor and driven thereby, a control-valve, passages or conduits connecting the fluid-pressure generator with the control-valve, a secondary motor connected with the drive-axle of the vehicle, passages or conduits connecting said secondary motor with the control-valve, said pump and said control-valve having provisions in virtue of which said valve controls the quantity of liquid pumped and said control-valve also having provisions in virtue of which the direction of rotation of the secondary motor may be reversed substantially as shown and described.

8. In a variable-speed hydraulic-power-transmission mechanism, the combination with a vehicle and a constant-speed drive-motor carried thereby, of a rotary intergeared piston fluid-pressure generator coupled to said drive-motor, a control-valve and a single lever for operating said control-valve, passages between said control-valve and said fluid-pressure generator, a secondary motor connected with the running-gear of the vehicle, fluid connections between said secondary motor and said control-valve, the pump and said control-valve having provisions in virtue of which the quantity of liquid pumped is controlled by said valve to accelerate or retard the speed of the vehicle and said control-valve having provisions in virtue of which the direction of rotation of the secondary motor and the running-gear of the vehicle may be reversed without interfering with the speed and direction of rotation of the drive-motor and said control-valve also having provisions in virtue of which the vehicle-motor may be brought to rest without interfering with the speed of rotation of the drive-motor, and an automatically-operating fluid-governor mechanism for varying the amount of liquid pumped when ascending grades substantially as shown and described.

9. In a variable-speed hydraulic-power-transmission mechanism, the combination with the vehicle and a constant-speed drive-motor carried thereby, of a rotary intergeared piston fluid-pressure generator coupled to said drive-motor, a control-valve, and a single lever operating the same, passages between said control-valve and said fluid-pressure generator, a secondary motor connecting with the running-gear of the vehicle, fluid connections between said secondary motor and said control-valve, the pump and said control-valve including means for controlling the quantity of liquid pumped to accelerate or retard the speed of the vehicle and means whereby the direction of rotation of the secondary motor and the running-gear of the vehicle may be reversed without interfering with the speed and direction of rotation of the drive-motor, and means whereby said vehicle may be brought to rest without interfering with the speed or rotation of the drive-motor, and an automatically-operating governor mechanism connected in said fluid connection between the pressure-generator and said control-valve and operable by back pressure due to the grade of the road to vary the amount of liquid pumped when ascending grades, substantially as shown and described.

10. In a variable hydraulic speed power-transmission mechanism, the combination with the vehicle and a constant-speed drive-motor carried thereby, of a rotary intergeared piston fluid-pressure generator coupled to said drive-motor, a control-valve, fluid connections between said control-valve and said fluid-pressure generator, a secondary motor connected with the running-gear of the vehicle, fluid connections between said secondary motor and said control-valve, the pump and said control-valve including means for controlling the quantity of liquid pumped to accelerate or retard the speed of the vehicle, said valve including means whereby the direction of rotation of the secondary motor and running-gear of the vehicle may be reversed without interfering with the speed and direction of rotation of the drive-motor and means whereby said secondary motor may be brought to rest without interfering with the speed of rotation of the drive-motor, and an automatically-operating governor mechanism for varying the amount of liquid pumped when ascending grades substantially as shown and described.

11. An apparatus of the class described, comprising in combination with the drive-motor, a secondary motor and a control-valve, of a pressure generator or pump comprising a casing including a main piston-chamber having inlet and outlet ports in communication with the control-valve, a first shaft endwise movable in said chamber, a gear mounted on and rotatable with said first shaft, a rotary pumping-piston mounted on, rotatable and endwise movable with said first shaft, said casing including supplemental chambers, a second shaft passing through said supplemental chambers and connected with the drive-motor, a gear on said second shaft for meshing with said first-mentioned gear, a second rotary pumping-piston rotatable with and mounted on said second shaft, and means for moving the first-mentioned shaft endwise to cause said pumping-pistons to become engaged with each other.

12. An apparatus of the class described, comprising in combination with the drive-motor, a secondary motor and a control-valve, of a pressure generator or pump comprising a casing including a main piston-chamber having inlet and outlet ports in communication with the control-valve, a first shaft endwise movable in said chamber, a gear mounted on and rotatable with said first shaft, a rotary pumping-piston mounted on, rotatable and endwise movable with said first shaft, said casing including supplemental chambers, a second shaft passing through said supplemental chambers and connected with the drive-motor, a gear on said second shaft for meshing with said first-mentioned gear, a second rotary pumping-piston rotatable with and mounted on said second shaft, and means for moving said first shaft endwise to disengage said pumping-pistons.

13. An apparatus of the class described comprising in combination with the drive-motor, a secondary motor and a control-valve, of a pressure generator or pump comprising a casing including a main piston-chamber having inlet and outlet ports in communication with the control-valve, a first shaft endwise movable in said chamber, a gear mounted on and rotatable with said first shaft, a rotary pumping-piston mounted on, rotatable and endwise movable with said first shaft, said casing including supplemental chambers, a second shaft passing through said supplemental chambers and connected with the drive-motor, a gear on said second shaft for meshing with said first-mentioned gear, a rotary pumping-piston rotatable with and mounted on said second shaft, means for moving said first shaft endwise to disengage said pumping-pistons, and means for moving said shaft in an opposite endwise direction to bring said pumping-pistons into engagement with each other.

14. An apparatus of the class described, comprising in combination with the drive-motor, a secondary motor and a control-valve, of a pressure generator or pump comprising a casing including a main piston-chamber having inlet and outlet ports in communication with the control-valve, a first shaft endwise movable in said chamber, a gear mounted on and rotatable with said first shaft, a rotary pumping-piston mounted on, rotatable and endwise movable with said first shaft, said casing including supplemental chambers, a second shaft passing through said supplemental chambers and connected with the drive-motor, a gear on said second shaft for meshing with said first-mentioned gear, a second rotary pumping-piston rotatable with and mounted on said second shaft, a pair of supplemental pistons on said first shaft at either end of the rotary pumping-piston, said supplemental pistons being endwise movable with said pumping-piston, means for holding one of said supplemental pistons from rotation, and means for moving said first shaft endwise in one direction, and means for moving said first shaft endwise in an opposite direction, all being arranged substantially as shown and for the purposes described.

15. An apparatus of the character described, comprising in combination with the drive-motor, a secondary motor and a control-valve, of a pressure generator or pump comprising a casing including a main piston-chamber having inlet and outlet ports in communication with the control-valve, a first shaft endwise movable in said chamber, a gear mounted on and rotatable with said first shaft, a rotary pumping-piston mounted on, rotatable and endwise movable with said first shaft, said casing including supplemental chambers, a second shaft passing through said supplemental chambers and connected with the drive-motor, a gear on said second shaft for meshing with said first-mentioned gear, a second rotary pumping-piston rotatable with and mounted on said second shaft, a pair of supplemental pistons on said first shaft at either end of the rotary pumping-piston and endwise movable therewith, means for holding one of said supplemental pistons from rotation, said casing including supplemental chambers to receive the first shaft ends, a piston on each end of said first shaft movable in said supplemental piston-chambers, and means for moving said first shaft endwise, for the purposes specified.

16. An apparatus of the class described, comprising in combination with the drive-motor, a secondary motor and a control-valve, of a pressure generator or pump comprising a casing including a main piston-chamber having inlet and outlet ports in communication with the control-valve, a first shaft endwise movable in said chamber, a gear mounted on and rotatable with said first shaft, a rotary pumping-piston mounted on, rotatable and endwise movable with said first shaft, said casing including supplemental chambers, a second shaft passing through said supplemental chambers and connecting with the drive-motor, a gear on said second shaft for meshing with said first-mentioned gear, a second rotary pumping-piston rotatable with and mounted on said second shaft, said secondary motor including a casing and gear-pistons mounted therein, said motor-casing having inlet and outlet ports in communication with said control-valve, said control-valve having ports arranged to cut out said second motor when in one position, and to open up communication between the inlet and outlet ports of the secondary motor when in another position, and to open up communication between the outlet-port of the pressure generator or pump and the inlet-port of the secondary motor, and between the outlet-port of the secondary motor and the inlet-port of the pressure-generator for the purposes specified.

17. An apparatus of the class described, comprising in combination with the drive-motor, a secondary motor, and a control-valve, of a pressure generator or pump comprising a casing including a main piston-chamber having inlet and outlet ports in communication with the control-valve, a first shaft endwise movable in said chamber, a gear mounted on and rotatable with said first shaft, a rotary pumping-piston mounted on, rotatable and endwise movable with said first shaft, said casing including supplemental chambers, a second shaft passing through said supplemental chambers and connecting with the drive-motor, a gear on said second shaft for meshing with said first-mentioned gear, a second rotary pumping-piston rotatable with and mounted on said second shaft, said secondary motor including a casing and gear-pistons mounted therein, said motor-casing having inlet and outlet ports in communication with said control-valve, said control-valve having ports arranged to cut out said secondary motor when in one position, and to open up communication between the inlet and outlet ports of the secondary motor when in another position, and to open up communication between the outlet-port of the pressure generator or pump and the inlet-port of the secondary motor, and between the outlet-port of the secondary motor and the inlet-port of the pressure-generator, and means for moving said first shaft of the pressure-generator endwise in one direction to cause said rotary pumping-pistons to become engaged with one another, and means for moving said first shaft of the pressure-generator in an opposite direction to cause said rotary pumping-pistons to become disengaged from one another, all being arranged substantially as shown and for the purposes specified.

18. An apparatus of the class described, comprising in combination with the main drive-motor, a pressure-generator including a casing, rotary pumping-pistons mounted within said casing, means for driving said rotary pumping-pistons from said drive-motor, a shaft endwise movable within said casing and carrying one of said rotary pumping-pistons, supplementary piston-chambers, to receive the ends of said endwise-movable shaft, said pumping-chambers having inlet and outlet ports, the outlet-port of said pumping-chamber being in communication with one of said supplemental shaft-piston-receiving chambers, a secondary motor having inlet and outlet ports, a valve mechanism connected with said motor inlet and outlet ports and with said inlet and outlet ports of the pressure-generator, said control-valve including a casing, a rotary valve proper within said casing, a relief-valve within said rotary valve proper, said rotary valve dividing said casing into two chambers communicating with each other through said relief-valve, said control-valve mechanism including a supplemental chamber, a piston held in said supplemental chamber, said control-valve including an operating-lever and a valve-carrying shaft, said valve-piston being rotatable with and endwise movable on said valve-shaft, said supplemental chamber being in communication with the second supplemental chamber of the supplemental shaft-piston-receiving chambers of the pressure-generator, and means for moving said supplemental valve-piston endwise, for the purposes specified.

19. In a variable-speed hydraulic-power-transmission mechanism, the combination with a vehicle, of a constant-speed motor mounted thereon for propelling the same, a fluid-pressure generator or pump, a secondary motor connected with the drive-axles of the vehicle rotatable thereby, a fluid-circuit between said pump and said motor, means comprising a valve having provisions in virtue of which starting, stopping, coasting, braking, reversing, and all changes or variations of speed of the vehicle are absolutely controlled by the manipulation of a single lever which actuates said valve, a lever for operating said valve and means actuated by back pressure due to the grade of the road to vary the output of the pump to vary the speed of the vehicle when said lever is adjusted to occupy certain predetermined positions substantially as shown and described.

20. In a power-transmission mechanism, the combination with the vehicle, a vehicle-motor mounted thereon, a running-gear for said vehicle, of a supplemental fluid-operated drive-motor connected to the running-gear of the vehicle and a variable fluid-pressure mechanism interposed between the vehicle-motor and the supplemental motor to coöperatively connect the same, means interposed between the fluid-pressure mechanism and the secondary motor for controlling the operation thereof, means operated by fluid-pressure for varying the volume or quantity of fluid pumped when the pressure of said fluid delivered by the pump is increased above the normal pressure required to propel said secondary motor on a smooth and approximately level road, substantially as shown and described.

21. In a power-transmission mechanism, the combination with a vehicle, a vehicle-motor mounted thereon, a running-gear therefor, of a supplemental motor connected with the running-gear, a variable fluid-pressure mechanism interposed between the drive-motor and the secondary motor, valve-controlling means interposed between the fluid-pressure mechanism and the supplemental motor for controlling the operation thereof, and a fluid-operated governor mechanism actuated by back pressure due to the grade of the road to vary the output of the pressure-generator to vary the quantity of fluid pumped to the secondary motor to vary the speed of the vehicle automatically in ascending grades substantially as shown and described.

22. In a power-transmission mechanism, a pump, a fluid-operated motor, a plurality of conduits connecting the pump with the motor, a control-valve in said conduits, the pump having provision for varying its capacity, a fluid-actuated governor mechanism connecting with said pump and controlling said provision for varying the output of the pump and varying the speed of the motor automatically as the load on the motor is increased, substantially as shown and described.

23. In a power-transmission mechanism, a pump, a fluid-operated motor, a plurality of conduits connecting the pump with the motor, a control-valve in said conduits, the pump having provision for varying its capacity, a fluid-actuated governor mechanism connecting with said pump and controlling said provision for varying the output of the pump and varying the speed of the motor automatically as the load on the motor is increased, said governor comprising a casing, a piston movable therein, means for normally holding the piston in one position, said piston being moved to another position by the fluid back pressure due to variations in the load on the motor to automatically vary the speed of said motor as the load thereon is varied substantially as shown and described.

24. In a power-transmission mechanism, the combination with a vehicle, a drive-motor therefor, a pump of variable capacity connected with the drive-motor, a secondary motor connected to the running-gear of the vehicle, said pump being connected to said secondary motor, of means actuated by back pressure due to the grade of the road to vary the output of the pump to vary the speed of the vehicle automatically when the pump is operating to propel the vehicle substantially as shown and described.

25. In a power-transmission mechanism, the combination with a vehicle, a vehicle-motor mounted thereon, a running-gear for the vehicle, a supplemental drive-motor connected to the running-gear, a fluid-pressure mechanism connected to the vehicle-motor, conduits connecting the fluid-pressure mechanism with the secondary motor, of a valve interposed between the fluid-pressure generator and the secondary motor, in said conduits, a single lever directly connected to the valve-stem for operating said valve, said valve having provisions in virtue of which starting, stopping, coasting, braking, reversing and all changes or variations of speed of the vehicle are controlled by the manipulation of said single valve-operating lever directly connected to the valve-stem and means connected between the fluid-pressure mechanism and the valve, actuated by back pressure due to the grade of the road, to vary the output of the fluid-pressure mechanism to vary the speed of the vehicle when the valve is in certain predetermined positions.

26. A power-transmission mechanism comprising a fluid-circuit, and means for causing a circulation of fluid in said circuit, a fluid-operated secondary motor in said circuit operable by said fluid, a control-valve in said circuit, an actuating-lever therefor, said valve having provisions in virtue of which starting, stopping, coasting, braking, reversing and all changes or variations of speed of the secondary motor are absolutely controlled by the manipulation of a single valve-actuating lever, said secondary motor comprising a casing, a two-part shaft passing through said casing, a pair of gear members one secured to each of said shaft parts and concentric with the casing, a pair of rim-gears for meshing with said first-mentioned gears and arranged eccentrically within the casing, a partition member arranged between said pairs of gears, said partition member having lateral wings arranged between the concentrically-arranged gears and the eccentrically-arranged rim-gears, said partition serving to divide the casing into an upper and lower chamber, said upper and lower chambers forming a part of the fluid-circuit, substantially as shown and described.

27. A power-transmission mechanism comprising the combination with a fluid-pumping means and a control-valve therefor, of a fluid-operated motor, said motor comprising a casing, a pair of concentrically-arranged gears mounted within said casing, a pair of internal rim-gears one for each of said concentrically-arranged gears, said rim-gears being mounted eccentrically within the casing and meshing with said concentrically-arranged gears, said rim-gears and said concentrically-arranged gears being arranged in pairs, a division member disposed between said pairs of gears to divide the casing into an upper and lower compartment, said division member having lateral wings interposed between the concentrically-arranged gears and their respective rim-gears, said casing-chambers being in communication with the fluid-circuit, substantially as shown and described.

28. A fluid-operated drive-motor of the character stated, comprising a two-part casing having bearing portions, a pair of alining shafts having engaging ends arranged within the bearing portions of said casing, gear members arranged one each on the casing end of each shaft concentric therewith, a pair of internal rim-gears one for each shaft-gear, said rim-gears being arranged eccentrically to the shafts within the casing, said gears all arranged in sets, a partition member arranged between each set of gears, said partition member having lateral wings for projecting between each shaft-gear and its respective rim-gear, said partition member dividing the casing into upper and lower compartments, and means for admitting fluid into one of said compartments and withdrawing the same from the other compartment to operate said gears to rotate the shafts, substantially as shown and described.

JOHN CLINTON RIEGEL.

Witnesses:
E. P. LEUSCHNER,
J. A. HAAS.